United States Patent [19]

Kuno et al.

[11] Patent Number: 4,717,526

[45] Date of Patent: Jan. 5, 1988

[54] POLOIDAL COIL ARRANGEMENT FOR A NUCLEAR FUSION APPARATUS

[75] Inventors: Kazuo Kuno; Shigeyuki Takagi; Daisaburo Nagata; Shintaro Fukumoto, all of Kobe, Japan

[73] Assignee: Mitsubishi Denki Kabushiki Kaisha, Japan

[21] Appl. No.: 696,576

[22] Filed: Jan. 30, 1985

[30] Foreign Application Priority Data

Jan. 31, 1984 [JP] Japan .................................. 59-14342

[51] Int. Cl.⁴ ......................... G21C 1/00; H01F 27/24
[52] U.S. Cl. ..................................... 376/142; 336/216; 336/223
[58] Field of Search ....................... 376/142; 174/94 R; 336/223, 216

[56] References Cited

U.S. PATENT DOCUMENTS

| 1,406,245 | 2/1922 | Thordarson | 336/216 |
| 2,330,824 | 10/1943 | Granfield | 336/216 |
| 2,712,084 | 6/1955 | Bridonbough | 336/216 |
| 3,793,129 | 2/1974 | Doggart et al. | 336/216 |

FOREIGN PATENT DOCUMENTS

| 0072090 | 6/1977 | Japan | 376/142 |
| 624767 | 5/1945 | United Kingdom | 336/216 |

OTHER PUBLICATIONS

"The Toroidal and Poloidal Magnetic Field Coils of the ASDEX Tokomak", Allgeyer et al., *Proceedings of the Sixth Symposium on Engineering Problems of Fushion Research,* IEEE Pub. No. 75CH1097-5-NPS, Nov. 20, 1975, pp. 777-780.
"Silver Brazing Methods for Joining the OH and SF Field Coil Turns for the PLT Machine", Bahr et al., (same citation as above), Nov. 19, 1975, pp. 480-483.

*Primary Examiner*—Harvey E. Behrend
*Attorney, Agent, or Firm*—Leydig, Voit & Mayer

[57] ABSTRACT

A poloidal coil arrangement for a nuclear fushion apparatus comprises at least two poloidal coil sections each including a plurality of conductor turns, and a plurality of bridging joining members for electrically and metallurgically joining the turn ends of the conductor turns to form a plurality of complete turns. The joining members have end surfaces shaped such that the joining members can be supported by the end surfaces of the conductor turns. The length in the circumferential direction of the top side of each joining member is nearly equal to or shorter than the length in the circumferential direction of the opposing lower side of the upper joining member located above that joining member.

3 Claims, 5 Drawing Figures

POLOIDAL COIL ARRANGEMENT FOR A NUCLEAR FUSION APPARATUS

BACKGROUND OF THE INVENTION

The present invention relates to a poloidal coil arrangement for a nuclear fusion apparatus, and more particularly, to an improvement for connecting portions in which a plurality of divided poloidal coils are connected to each other through joining members.

A conventional nuclear fusion apparatus of the torus-type comprises a vacuum vessel, a plurality of toroidal coils, and a plurality of poloidal coils in order to confine and heat a plasma generated within the vacuum vessel. The vacuum vessel is of a hollow doughnut shape, and the poloidal coils extend along the vacuum vessel in the circumferential direction with respect to the longitudinal axis of the apparatus while the toroidal coils extend perpendicularly to the poloidal coils and the vacuum vessel and surround them. The poloidal coils and the vacuum vessel are concentrically disposed.

Accordingly, in order to assemble the apparatus, the plurality of toroidal coils must be divided into at least two sections, or the poloidal coils and the vacuum vessel must be circumferentially divided into at least two sections. In the latter case, the vacuum vessel and the respective poloidal coil sections are separated to form a sufficiently large gap therebetween for allowing the toroidal coils to pass through the gap. The vacuum vessel and the poloidal coil sections are then electrically and mechanically joined by connecting members for bridging the gap using screw or bolt joints for example. An example of such a screw joint is described in detail in an article entitled "The Toroidal and Poloidal Magnetic Field Coils of the ASDEX Tokamak", by R. Allgeyer et al., in "Proceedings of the Sixth Symposium on Engineering Problems of Fusion Research", IEEE Pub. No. 75CH1097-5-NPS, Nov. 20, 1975, pp. 777–780. However, the conventional screw joint which requires a certain conductor thickness is not suitable for use in a recent large, sophisticated nuclear fusion apparatus in which the conductor coil turns are thin and have cross sectional dimension of, e.g., 4 mm × 125 mm, required to cope with the limited space within the apparatus.

Alternatively, an example of a silver braze joint for coil turn sections is disclosed in an article by M. W. G. Bahr et al. entitled "Silver Brazing Methods for Joining the OH and SF Field Coil Turns for the PLT Machine" in "Proceedings of the Sixth Symposium on Engineering Problems of Fusion Research", IEEE Pub. No. 75CH1097-5-NPS, Nov. 19, 1975, pp. 480–483. The braze joint is more suitable for the recent apparatus than the screw joint because the conductor thickness is not a requisite condition. However, since the braze joint requires the successive heating of the coil turns of the conductor sections, insulating coatings on the conductor turns or the surrounding devices may be damaged by a torch during the brazing operation.

In a further detailed conventional apparatus using braze joints, each braze joint has the cross-sectional shape of an inverted trapezoid, and conductor turns have projecting portions for receiving the slanting sides of the inverted trapezoid of each braze joint. The end surfaces of the slanting sides of each braze joint and the end surfaces of the projecting portions of the conductor turns are heated at a temperature of e.g., 700° to 800° C. to weld each braze joint to each conductor turn. The braze joints of this shape have advantages in that the joints are supported entirely by the conductor turns and the weld length becomes longer. However, in this apparatus, when a joining member is welded to a conductor turn, the operation of a welding torch is hindered by projecting portions of conductor turns located above the conductor turn being welded, and insulating coatings on the conductor turns or other surrounding devices may be damaged during the welding operation, and conductor turns are not fully welded to each other through joining members. To overcome this problem, in another apparatus, the length of each braze joint with respect to the circumferential direction increases as conductors are turned so that the welding operation is not hindered by projecting portions of conductor turns. However, this conventional apparatus also has disadvantages in that it is difficult to assemble the apparatus since a space for the welding operation cannot be assured due to the increasing lengths of the braze joints with respect to the poloidal direction, and that the braze joints have sizes different from each other.

SUMMARY OF THE INVENTION

Accordingly, an object of the present invention is to provide a poloidal coil arrangement for a nuclear fusion apparatus in which the operation for joining conductor turns to each other through joining members is easily performed and the conductor turns are preferably and reliably connected to each other through the joining members.

Another object of the present invention is to provide a poloidal coil arrangement for a nuclear fusion apparatus in which the assembly of the apparatus is easy and the cost for manufacturing the apparatus is reduced.

With the above objects in view, the present invention provides a poloidal coil arrangement for a nuclear fusion apparatus, the poloidal coil arrangement comprising at least two poloidal coil sections spaced a predetermined distance apart and leaving a gap, each of the coil sections including a plurality of partial conductor turns having end surfaces. The poloidal coil arrangement further comprises a plurality of bridging joining members, each having a link substantially equal to the predetermined distance and bridging the gap to electrically and metallurgically join the turn and the surfaces of spaced partial conductor turns to form a plurality of complete turns. The joining member include convex end surfaces at opposite ends, the end surfaces of the partial conductor turns being shape complimentary to and contacting the convex joining member end surfaces at end joints to provide the sole support of said joining members upon assembly before the end joints are welded. The links in the circumferential direction of the top side of each joining member is nearly equal to or shorter than the length in the circumferential direction of the opposing lower side of the upper joining member located immediately above each joining member, whereby exposed edges of end joints between contacting end surfaces of each joining member and adjoining spaced partial conductor turns face the upper gap above each joining member to allow heat to be applied to the expose edges of a welding torch located in the upper gap before a bridging joining member is inserted in the upper gap.

In a preferred embodiment, the end surface of each joining member has a protruding portion which protrudes toward each conductor turn such that each joining member is supported by the respective conductor turns.

In another preferable embodiment, each of the joining members has the same shape.

DESCRIPTION OF THE PREFERRED EMBODIMENTS

Figure 1:
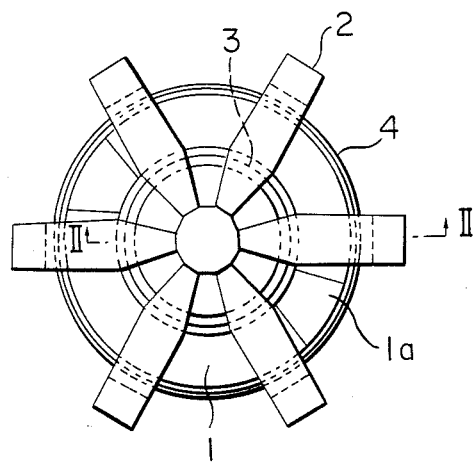
FIG. 1 is a plan view of a nuclear fusion apparatus according to the present invention.
Figure 2:
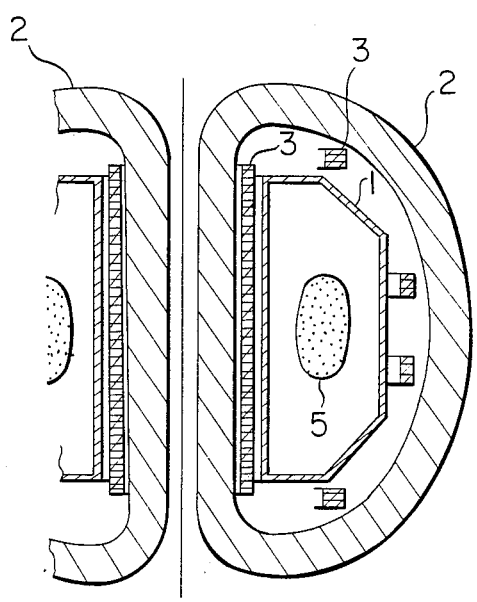
FIG. 2 is a cross sectional view taken along Line II-II in the nuclear fusion apparatus of FIG. 1.
Figure 3:
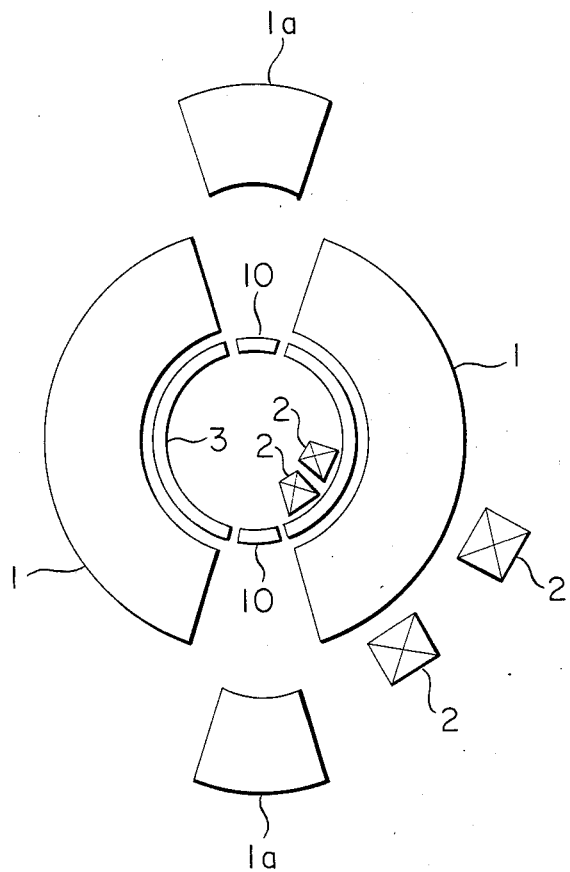
FIG. 3 is a plan view showing the circumferentially divided vacuum vessel in the nuclear fusion apparatus.

FIGS. 1 and 2 illustrate a typical Tokamak type nuclear fusion apparatus using a poloidal coil arrangement according to the present invention. The nuclear fusion apparatus comprises a vacuum vessel 1 of a torus shape in which a plasma 5 is generated and maintained. The plasma 5 is confined and controlled by a plurality of toroidal coils 2 and a plurality of poloidal coils 3. When viewed from above, the toroidal coils 2 appear to extend in the radial direction from the longitudinal axis of the apparatus, and surround the poloidal coils 3 and the vacuum vessel 1. The poloidal coils 3 include heating coils, vertical field coils, and compensating coils, and extend in the circumferential direction about the longitudinal axis of the apparatus along the vacuum vessel 1 within the toroidal coils 2. As can be seen from FIG. 3, in order to assemble the vacuum vessel 1, the poloidal coils 3, and the toroidal coils 2, the vacuum vessel 1 and the poloidal coils 3 must be divided into, e.g., two separate sections, and these separate sections are respectively supported with a distance therebetween which is sufficient to allow the toroidal coils 2 to pass through the gap. After the vessel sections and the poloidal coil sections have been inserted within the toroidal coils 2 and mechanically arranged in position, the respective separate sections are electrically and mechanically connected to each other by joining members. The vacuum vessel 1 has a divided inserting portion 1a to assure a space for connecting the poloidal coils 3 to each other. The inserting portion 1a is fitted to the vacuum vessel 1 after the poloidal coils 3 have been connected to each other.

Figure 4:
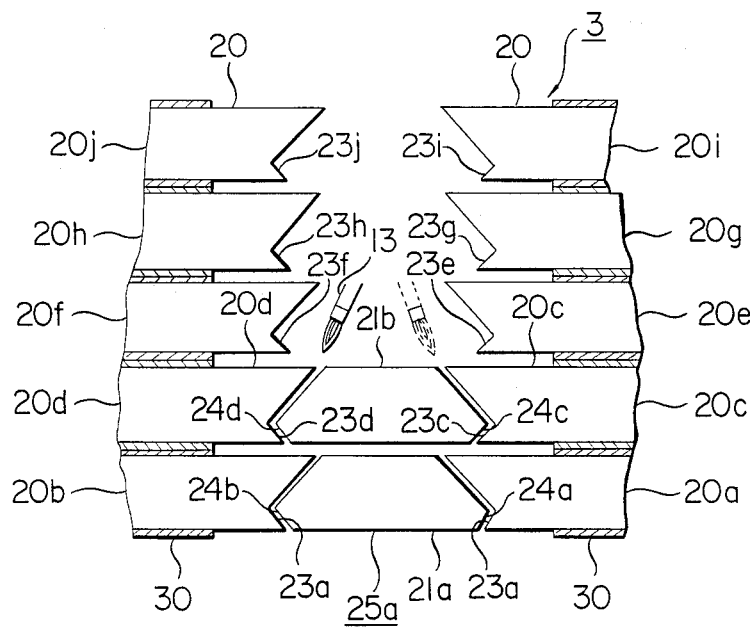
FIGS. 4 and 5 are enlarged cross sectional views showing an operation for joining divided conductor turns to each other through joining members according to one embodiment of the present invention.
Figure 5:
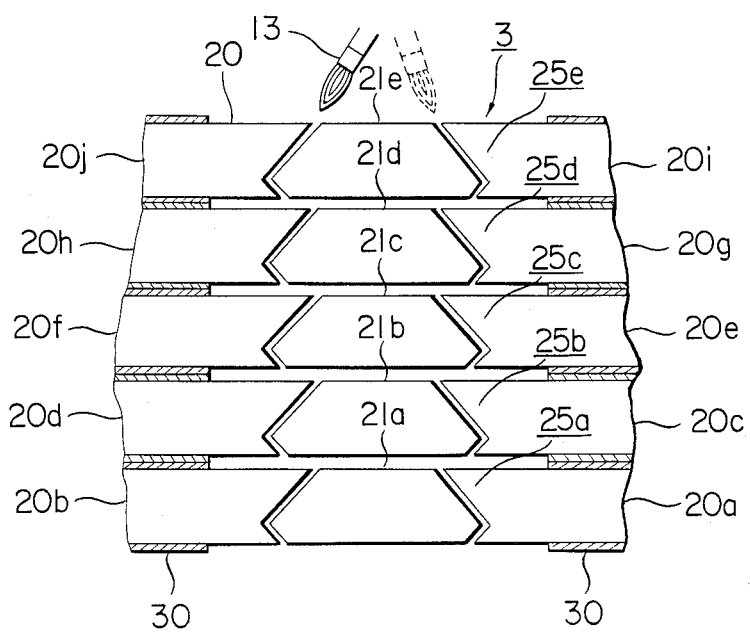

FIGS. 4 and 5 illustrate one embodiment of the poloidal coil arrangement according to the present invention. The poloidal coil arrangement comprises at least two divided poloidal coil sections 20 each having a plurality of conductor turns. In FIG. 4, each of the conductor turns 20a to 20j is coated with an electrically insulating inner coating 30 which is also coated with an electrically insulating outer coating. The separate conductor turns 20a to 20j are electrically and metallurgically connected to respective joining members 21a to 21e to form a plurality of complete conductor turns. The joining members 21a to 21e have end surfaces 24a to 24j at both ends protruding toward the conductor turns 20a to 20j, respectively, and the conductor turns 20a to 20j have recessed end surfaces 23a to 23j for respectively receiving and supporting the end surfaces 24a to 24j of the joining members, to that the joining members 21a to 21e can be supported by the respective conductor turns 20a to 20j. In FIG. 4, each of the end surfaces 24a to 24j of the joining members 21a to 21e has a generally L-shaped cross section. Accordingly, the joining members 21a to 21e are respectively supported by the conductor turns 20a to 20j by engagement of the end surfaces of the conductor turns with the lower portions of the end surfaces 24a to 24j of the joining members 21a to 21e. The length in the circumferential direction of each upper side of the joining members 21a to 21e is nearly equal to or shorter than the length in the circumferential direction of the opposing lower side of an upper joining member located above the joining member. For example, the length in the circumferential direction of the upper side of the joining member 21a is nearly equal to or shorter than the length in the circumferential direction of the lower side of the upper joining member 21b. Each of the joining members 21a to 21e preferably has the same shape. In the apparatus according to the present invention, each joining member is welded to each conductor turn successively from below to above.

In the apparatus constituted as above, when the joining members 21a to 21e are respectively connected to the conductor turns 20a to 20j by e.g., braze welding, it is not necessary to provide a means for supporting the joining members 21a to 21e. Furthermore, the lengths of the weld between the conductor turns 20a to 20j and the joining members 21a to 21e become longer than the conventional lengths thereof, thereby further strengthening their connections.

When the length of the upper side of each of the joining members 21a to 21e is shorter than the length of the opposing lower side of the joining member located above it, the upper conductor turns do not hinder the operation of heating by a torch 13 the end surfaces of the lower conductor turns. When the end surfaces 23a to 23j of the conductor turns are heated by the torch 13, the flame of the torch 13 reaches all the areas of the end surfaces of the conductor turns by being guided along the long upper slanting surfaces of the end surfaces 23a to 23j of the conductor turns, so that the respective connecting portions 25a to 25e between the conductor turns 20a to 20j are fully heated and welded. Thus, the connecting portions 25a to 25e are prepared to be preferably welded, and the torch 13 does not damage the insulating coatings on the poloidal coils 3 or the surrounding devices such as the toroidal coils 2, etc. when the connecting portions 25a to 25e are heated by the torch 13.

Then, the end surfaces 24a to 24j of the joining members 21a to 21e are respectively connected to the end surfaces 23a to 23j of the conductor turns 20a to 20j successively from the lower connecting portions to the upper connecting portions. After the completion of the welding operation, the connecting portions 25a to 25e are respectively coated with inner and outer insulating coatings as in the conventional arrangement, thereby forming a plurality of complete conductor turns into a poloidal coil arrangement.

In the above construction of the poloidal coil arrangement, each of the joining members 21a to 21e has protruding end surfaces which protrude toward the respective conductor turns, and each of the conductor turns 20a to 20j has a recessed end surface in which the joining members are received and supported. However, in order to support the joining members by the conductor turns, each of the joining members may instead have recessed end surfaces, and each of the conductor turns may have a protruding end surface which fits into one of the recessed end surfaces of the joining members and support them.

In the above embodiment, there is described a poloidal coil arrangement comprising two poloidal coil sections with conductor turns divided into two separate portions every turn, but a poloidal coil arrangement may comprise three or more poloidal coil sections with conductor turns divided into three or more separate portions per turn. Furthermore, the conductor turns are electrically and mechanically connected to each other by braze welding through the joining members, but the conductor turns may be connected to each other through joining members by pressure welding or fusion welding.

As mentioned above, in a nuclear fusion apparatus according to the present invention, joining members have surfaces which can be supported by surfaces of conductor turns, and the length in the circumferential direction of the top side of each joining member is nearly equal to or shorter than the length in the circumferential direction of the opposing lower side of an upper joining member located above the joining member. Accordingly, the end surfaces of the conductor turns are exposed so that their surfaces can be easily heated so that the conductor turns are easily preferably connected to each other, and insulating coatings on the poloidal coils or the surrounding devices are not damaged at all when the conductor turns are connected to each other through joining members. Furthermore, when each of the conductor turns has the same shape and each of the joining members also has the same shape, it is easy to assemble the apparatus and the cost for manufacturing the apparatus is reduced.

What is claimed is:

1. In a nuclear fusion apparatus having a poloidal coil arrangement, said poloidal coil arrangement comprising;

at least two poloidal coil sections spaced a predetermined distance apart and leaving a gap, each of said coil sections including a plurality of partial conductor turns having end surfaces, and a plurality of bridging joining members, each having a length substantially equal to the predetermined distance and bridging the gap to electrically and metallurgically join said turn end surfaces of spaced partial conductor turns to form a plurality of complete turns, said joining members having convex end surfaces at opposite ends, said end surfaces of said partial conductor turns being shaped complementary to and contacting said convex joining member end surfaces at end joints to provide the sole support of said joining members upon assembly before the end joints are welded, the length in the circumferential direction of the top side of each joining member being nearly equal to or shorter than the length in the circumferential direction of the opposing lower side of the upper joining member located immediately above each joining member, whereby exposed edges of end joints between contacting end surfaces of each joining member and adjoining spaced partial conductor turns face the upper gap above each joining member to allow heat to be applied to the exposed edges from a welding torch located in the upper gap before a bridging joining member is inserted in the upper gap.

2. A poloidal coil arrangement for a nuclear fusion apparatus as claimed in claim 1 wherein said end surface of each joining member is convex L-shaped and has a protruding portion which protrudes toward each adjoining conductor turn end surface which has a complementary shape such that each joining member is supported by the adjoining conductor turn end surfaces.

3. A poloidal coil arrangement for a nuclear fusion appartus as claimed in claim 1 wherein each of the joining members has the same shape.

* * * * *